United States Patent Office 2,815,783
Patented Dec. 10, 1957

2,815,783

SESAME SEED DECORTICATOR

Gabriel Horvilleur, Managua, Nicaragua, assignor to Palazio, Horvilleur & Co. Ltd., Managua, Nicaragua, a Nicaraguan company No Drawing. Application June 25, 1954,
Serial No. 439,489

Claims priority, application Nicaragua October 6, 1953

12 Claims. (Cl. 146—221.8)

The present invention relates to a method for decorticating sesame seed to produce a decorticated seed of excellent quality and appearance by a simpler and more efficient, and therefore less time-consuming and less expensive, treatment than hitherto employed.

Prior art methods for the decortication of sesame seed have involved hand methods and machine methods. Soaking and decorticating by hand, a centuries-old process carried out in China, is time-consuming and laborious. Soaking and mechanical decorticating processes have the important disadvantage that the hull frequently is not sufficiently softened by ordinary soaking and the machine peels many of the grains unevenly, resulting in lack of uniformity in color and appearance. Other treatments include the use of common salt which is used also as the abrasive for the grinding away of the hull but this method has been slow and tedious and the quality of the product is non-uniform. The methods using decorticating machines have also encountered difficulty in separating the mixture of stripped seeds and hulls which tend to stick together so as to contaminate the product.

Previous experience with the use of sodium hydroxide at room temperature followed by mechanical or frictional decortication has not been successful in producing a uniform quality seed. The seeds tend to become discolored and lose some of their brightness or reflectivity properties. Further the shrinkage is excessive (about 20%) and the seeds tend to take on a flattened appearance. The hulls are insufficiently disintegrated and the conventional screening devices in the usual machinery become clogged when rinsing the decorticated seeds.

The primary object of the present invention is the embodiment of a process for the decortication of sesame seed which is free of the prior art defects, which yields an optimum product and which is economically feasible.

This object, and others which will be manifest from the detailed description which follows, is realized according to the process of the present invention. Briefly stated, the principle of this process is subjecting the seed to be decorticated to the action of a dilute aqueous alkaline lye for a very short period of time at elevated temperature. Optimally, this temperature is the boiling point, or substantially the boiling point, of the treating liquid, whereupon disintegration—in effect, actual disappearance as such—of the hulls takes place. At the end of the said time interval, the "hot" period is terminated—for example, by the rapid addition of cold water; this water can, if desired, be simultaneously used to flush away the disintegrated or "fluidized" hulls leaving decorticated seeds which, because of the short interval of time during which they have been exposed to hot alkali, are left substantially unaffected, i. e. are in optimum condition as to color, brightness, firmness, etc.

However, it is sometimes difficult, particularly when working on a large scale, to maintain the treatment batch at the optimum temperature. The very fact that seed is added to the hot treating liquid results in a lowering of the temperature thereof so that optimum disintegration, i. e. conversion of the hulls from a solid state to a "fluidized" state enabling them to be flushed away from the decorticated seed, may not be achieved. To counteract this drop in temperature, according to the invention, the features of extended immersion and agitation are introduced so that when working on a so-called large scale, the process involves simultaneous soaking, heating and agitating.

It is possible, even in a large scale treatment, to have such a large ratio of treating liquid to sesame seed being treated that the addition of the latter to the substantially boiling treating bath does not result in an appreciable temperature drop. However, this entails the use and handling of a non-economic quantity of lye and water. It is therefore preferred to use an economically feasible ratio of treating liquid to sesame seed—about 2:1 to about 3:1 (liquid to solid by weight)—and to compensate for the slight temperature drop by introduction of the agitation-extended immersion period factors into the process. However, higher ratios—e. g. up to 10:1 or higher—are operative, although no particular advantage is thereby entailed.

The procedure according to the invention thus includes, as stated, an embodiment which may be carried out at boiling temperature (about 95–100° C.) of the treating bath, as well as embodiments which are carried out at lower temperatures, e. g. at temperatures within the 85–95° C. range or at temperatures within the 60–85° C. range.

In carrying out the process at the theoretically optimum disintegrating temperature—the aforesaid boiling or incipient boiling temperature of 95–100° C.—the duration of the "hot" period has to be closely controlled if heat-damage to the sesame seed is to be avoided. According to the present invention, such period lasts from 1 to 2 minutes, the preferred treating period lasting about one and a half minutes. To avoid darkening of the seed, a dilute aqueous caustic alkaline lye of a concentration of about 0.5° to about 2.5° Baumé is employed, the preferred concentration being at about 2° Bé. Concentrations up to as high as 5° Bé. or more may be employed without darkening the seeds; such higher concentrations present no advantage, however, and are therefore relatively uneconomical.

This embodiment of the process may be carried out with or without agitation of the treatment mass. To this end, agitating paddles may be provided in the bath container—e. g. after the manner of a so-called "Waring Blendor."

Usually it will be found, in practice, that even if the sesame seed is added to the boiling treating liquor—using the afore-indicated concentration and liquor-to-seed ratio—the temperature of the bath will drop. Thus, with an initial (boiling) temperature of e. g. 96° C., the temperature will be lowered to about 88° when the sesame seed to be decorticated is added. Under these circumstances, the immersion period is, according to the present invention, extended to about 4 minutes, of which the first two minutes are at about the 88° temperature while the last two minutes are at a temperature of about 74° C., this temperature being achieved by the addition of cooling water to the mixture. Additionally, the treating mass (alkaline solution and seeds) may be agitated throughout the entire 4-minute immersion period.

Where it is desired to effect the decortication at a relatively low temperature (60–85° C.), the immersion period is correspondingly extended until, at the lowermost temperature (60° C.), it may last up to two hours. In this embodiment of the invention, it is preferred not to include simultaneous agitation, but rather to follow the immersion step with a mechanical frictional ("beating") decortication treatment.

The invention also contemplates the use of caustic bleaching solutions, such as aqueous solutions of sodium peroxide, sodium perborate, sodium hypochlorite, as a replacement for part or all of the alkali metal hydroxide (sodium hydroxide or potassium hydroxide) in the aforedescribed decorticating procedures, the effective alkali concentration of the caustic bleach being within the limits aforedescribed for the simple caustic alkaline treating liquid and the conditions being otherwise as previously (boiling temperature, 1 to 2 minute treating period, 2:1 to 3:1 bath to solid ratio; supplemented by extended immersion and simultaneous agitation or subsequent beating as lower temperatures are alternatively employed). For example, the aqueous bath may contain 0.5% by weight of sodium hydroxide and 0.5% by weight of sodium hypochlorite, whereupon the hulls are completely "fluidized" or disintegrated in one and one-half minutes immersion time at 95–100° C. The same results are obtained for example with a 1% by weight aqueous solution of sodium peroxide under the same conditions of operation. Due to the relatively high cost of sodium peroxide and the aversion of workmen to the use thereof, this alternative procedure is not as preferred as the treatments with simple aqueous caustic alkaline solutions or the treatment with 0.5% NaOH and 0.5% NaOCl.

The recovered seed is very clean, light in color and surpasses commercial specifications for the highest grade of sesame seed. Shrinkage is kept as close to minimum as possible. The use of the alternative bleaching treatment has no adverse effect whatsoever on the smell or taste of the decorticated seed and ordinary rinsing and drying provides a product wherein there are no detectable residues of any of the alkali or bleach agents employed. The color is so pleasing and of such excellent shade that the use of "blue" edible dyes, as bleaches or whitening agents, is entirely unnecessary. Storage of the bleached seed at high temperatures for long periods of time shows that the treatment in accordance with the present invention produces a remarkable improvement in the storage stability of the food product. The product is of excellent quality for candy or food preparation purposes.

Other and further objects of the present invention will appear from the more detailed description which follows, it being understood that such detailed description is given by way of illustration and explanation only and not by way of limitation, since various changes therein may be made by those skilled in the art without departing from the scope and spirit of the present invention.

Representative embodiments of the invention are exemplified in the following examples. These examples are entirely illustrative and not at all limitative in character. In these examples, parts by weight bear the same relation to parts by volume as does the kilogram to the liter. Percentages are by weight.

Example 1

10 parts by weight of unhulled high quality sesame seed are immersed in 20 parts by volume (approximately 20 parts by weight) of 1.5% aqueous sodium hydroxide solution (about 2.2° Bé.) for one and a half minutes at 95–100° C., the temperature being maintained by the action of high pressure steam in the steam-jacketed container and/or by introducing live steam into the mixture itself, the said temperature range being that at which incipient boiling of the alkali metal hydroxide solution occurs. Sharply at the conclusion of the 1½ minute immersion interval, the "hot" period is terminated by pouring in cold water sufficient to reduce the temperature to e. g. about 60° C. The mixture is then poured onto a wire cloth tray or the like drainer, which may be vibrated if desired, whereupon the liquid runs through the cloth while the seeds are retained thereon. The hulls which have been wholly disintegrated or "fluidized," i. e. converted from the solid state essentially to the fluid state, are effectively part of such liquid and also pass through the cloth, being completely entrained or flushed out by the washing water which is then poured over the seed for thorough rinsing thereof. In this way, the hulls are entirely removed with no necessity whatever for resorting to a mechanical (frictional) decorticating treatment. If desired or necessary, further rinsing of the seeds may be carried out to eliminate any residual traces of impurities. The washed seeds are then dried and packed.

Example 2

The procedure according to Example 1 is repeated except that the time of treatment is extended to two minutes and a 1% aqueous NaOH solution is employed in lieu of the 1.5% solution of that example. As in the latter case, the seeds are completely decorticated with no necessity to resort to agitation or to any mechanical decorticating treatment whatever. As in Example 1, the obtained decorticated seeds are, after being dried, of high quality and brightness; moreover, they are excellent in taste and in appearance. They may be stored for long periods of time with no appearance of rancidity, off-smell or off-color or off-taste. The treatment according to the present invention does not involve any deterioration of the anti-oxidants contained in the seed. The color and brightness are of such high quality that bleaching by the hitherto usual means is totally unnecessary. This applies equally to the product obtained according to Example 1 as well as according to the several examples which follow and which involve only the caustic treating liquid employed under the conditions according to the present invention.

Example 3

The procedure according to Example 2 is repeated, using a 2% aqueous NaOH solution instead of a 1% solution. Essentially the same result is obtained as in the said example.

Example 4

10 parts by weight of sesame seed are treated with 30 parts by weight of an aqueous alkaline solution containing 0.5% NaOH and 0.5% sodium hypochlorite, the aqueous bath being maintained at a temperature of 95–100° C., the procedure being otherwise as described in Example 1, except that a two minute treatment period is employed. After rinsing and drying the thus-produced decorticated seed, the latter is found to be free from the odor which is characteristic of hypochlorite solutions. The taste, color and brightness of the seed are unimpaired.

Example 5

Sesame seeds are treated in the same proportion and under the same conditions as in Example 4 except that the aqueous solution consists of 0.5% sodium hydroxide and 0.5% sodium perborate. The same excellent results as in Example 4 are obtained.

Example 6

Sesame seeds are treated in the same proportion and under the same conditions as in Example 4 except that a 1% aqueous sodium peroxide solution is employed. The same excellent results as in Example 4 are obtained.

Example 7

The procedure according to Example 1 is repeated except that the contents of the treating bath are maintained in constant agitation during the 1½ minute "hot" period. The results are identical with those obtained according to Example 1.

The agitation step may thus be employed or omitted when proceeding after the manner described in Example 1. This applies also to the procedures described in Examples 2 to 6 inclusive.

*Example 8*

10 parts by weight of unhulled sesame seed are immersed in 20 parts by weight of 1.5% aqueous sodium hydroxide solution which is heated to incipient boiling (95–100° C.). The addition of the sesame seed results—in the absence of the heat-maintenance precautions described in Example 1—in lowering of the temperature of the alkaline treating liquid to about 85° C. Given sufficient time, the temperature of the bath (which is preferably steam-jacketed) would recover its original magnitude (95–100° C.); however, exposure of the seed at a temperature above 85° C. for the length of time necessary for the temperature restoration, would result in discoloration (heat-damage) of the seed.

To avoid this heat-damage, the treating bath is provided with means, such as a stirrer or the like, for maintaining the contents of the bath in constant agitation. Moreover, additionally to compensate for the lowered temperature, the treating period is extended to last four minutes—a two-minute "hot" period and a two-minute "cool" period—instead of the 1½ minutes employed according to Example 1.

It is here economically more feasible to resort to the extended immersion and supplemental agitation expedients rather than to attempt to maintain the 95–100° C. temperature range after the manner of Example 1.

Sharply at the conclusion of the two minute "hot" period, sufficient cooling water is added to lower the temperature of the mass to below 70° C., at which temperature immersion is continued for the remaining two minutes. The bath is agitated throughout the four minutes of immersion or only during the first two or last two minutes. The mixture is then poured onto a wire cloth tray or the like drainer, which may be vibrated if desired, whereupon the liquid runs through the cloth while the seeds are retained thereon. The hulls which have been wholly disintegrated or "fluidized," i. e. converted from the solid state essentially to the fluid state, are effectively part of such liquid and also pass through the cloth, being completely entrained or flushed out by the washing water which is then poured over the seed for thorough rinsing thereof. In this way, the hulls are entirely removed with no necessity whatever for resorting to a mechanical (frictional) decorticating treatment. The washed seeds are then dried and packed.

An aqueous treating solution containing 0.5% NaOH and 0.5% NaOCl may be used in lieu of the 1.5% NaOH solution.

*Example 9*

The procedure according to Example 8 is varied as follows:

10 parts by weight of unhulled sesame seed are immersed in 30 parts by weight of 2% aqueous sodium hydroxide solution which is heated to incipient boiling (95–100° C.). The temperature of the bath drops to about 88° C. The contents of the bath are agitated while keeping the seed immersed at about the said temperature for a "hot" period of about 2 minutes followed by a cool immersion period (70° C. or less) for 2 minutes, whereupon complete disintegration or "fluidization" of the seed will have been achieved.

The mixture is then poured onto a wire cloth tray or the like drainer, which may be vibrated if desired, whereupon the liquid runs through the cloth while the seeds are retained thereon. The hulls which have been wholly disintegrated or "fluidized," i. e. converted from the solid state essentially to the fluid state, are effectively part of such liquid and also pass through the cloth, being completely entrained or flushed out by the washing water which is then poured over the seed for thorough rinsing thereof. In this way, the hulls are entirely removed with no necessity whatever for resorting to a mechanical frictional) decorticating treatment. The washed seeds are then dried and packed.

*Example 10*

10 parts by weight of unhulled sesame seed are immersed in 25 parts by weight of 1.5% aqueous sodium hydroxide solution at a temperature of about 75° C. for a period of about ten minutes. The seeds are then subjected to a frictional decortication treatment of per se conventional manner. The resultant disintegrated hulls are flushed away from the decorticated sesame seeds during the rinsing operation. A good product is obtained.

The 1.5% sodium hydroxide solution may be replaced by a solution in water of 0.5% NaOH and 0.5% NaOCl.

*Example 11*

The procedure according to Example 10 is repeated, except that a temperature of 65° C. is employed and immersion is extended up to about one hour.

In the foregoing examples, potassium hydroxide may be used with equally good results instead of sodium hydroxide, although the latter is preferred because it is cheaper.

While batch treatment is presently preferred, it is within the scope of the present invention to operate the process thereof in a continuous manner. To this end, the treating mixture may be continuously passed through an inclined heated treating zone. Unhulled sesame seed and hot lye are introduced at one end of the zone which is provided with screw conveyor means or the like for progressively moving the mixture toward the outlet end. The extent of the immersion zone and the period of dwell of the mixture therein may be adapted to the conditions of the present invention as hereinbefore disclosed by varying the speed of operation of the conveyor, as required. Agitation may be obtained by means of agitating fins provided on the conveyor. Discharge of the treated seed together with disintegrated or fluidized hulls takes place at the outlet end of the said zone into a wire cloth tray or the like, where rinsing takes places, followed by drying and packaging of the decorticated seed.

It is thought that the invention and its advantages will be understood from the foregoing description and it is apparent that various changes may be made in the form, composition and arrangement of the ingredients without departing from the spirit and scope of the invention or sacrificing its material advantages, the forms hereinbefore described being merely preferred embodiments thereof.

Having thus disclosed the invention, what is claimed is:

1. In a process for the decortication of sesame seeds by the action thereon of aqueous caustic alkali, the steps of subjecting the seeds to the action of dilute aqueous caustic alkaline solution of a concentration of from about 0.5° Bé. to about 5° Bé. at a temperature of about 60° C. and up to and including the boiling temperature of the said solution for a predetermined period of time within the range of about two hours to one minute according to a time-temperature relationship whereby the treatment time is about one minute near the boiling point and about two hours at about 60° C., and with a ratio of treating liquid to seed in the range from about 2:1 to about 3:1 by weight, and thereafter washing the disintegrated hulls from the decorticated seeds.

2. A method of decorticating sesame seeds which comprises subjecting said seeds to the action of dilute aqueous caustic alkaline solution of a concentration of from about 0.5° Bé. to about 5° Bé. at a temperature of about 95° C. to about 100° C. and with a ratio of treating liquid to seed in the range from about 2:1 to about 3:1 by weight until "fluidizing" of the hulls of the seeds is achieved, forthwith terminating the treatment at the said temperature, and washing the disintegrated hulls away from the decorticated seeds.

3. A method of decorticating sesame seeds which comprises subjecting said seeds to the action of dilute aqueous caustic alkaline solution of a concentration of from about 0.5° Bé. to about 5° Be. at a temperature of about 95° C. to about 100° C. for a period of one to two minutes, with a ratio of treating liquid to seed in the range from about 2:1 to about 3:1 by weight, forthwith terminating the treatment at the said temperature with the aid of a coolant, and washing the disintegrated hulls away from the decorticated seeds.

4. In a process for the decortication of sesame seeds by the action thereon of aqueous caustic alkali, the steps of subjecting the seeds to the action of dilute aqueous caustic alkaline solution of a concentration of from about 0.5° Bé. to about 5° Bé. at a temperature of about 60° C. and up to and including the boiling temperature of the said solution for a predetermined period of time within the range of about two hours to one minute according to a time-temperature relationship whereby the treatment time is about one minute near the boiling point and about two hours at about 60° C., and with a ratio of treating liquid to seed in the range from about 2:1 to about 3:1 by weight, and thereafter washing the disintegrated hulls from the decorticated seeds, while maintaining the mixture of seeds and solution in a state of agitation, and thereafter washing the disintegrated hulls from the decorticated seeds.

5. A method of decorticating sesame seeds which comprises subjecting said seeds to the action of dilute aqueous caustic alkaline solution of a concentration of from about 0.5° Bé. to about 5° Bé. at a temperature between 60° C. and 70° C. for an extended period up to two hours, and then subjecting the thus-treated seeds to frictional decortication.

6. A method of decorticating sesame seeds which comprises subjecting said seeds to the action of dilute aqueous caustic alkaline solution of a concentration of from about 0.5° Bé. to about 5° Bé. at a temperature of from 85–95° C. during a first immersion period lasting but a few minutes and then at a temperature below about 70° C. during a second immersion period, while maintaining the mixture of seeds and solution in a state of agitation during at least one of the said periods, and then washing the disintegrated hulls away from the decorticated seeds.

7. A process according to claim 1 wherein the said solution contains sodium hydroxide.

8. A process according to claim 1 wherein the said solution contains sodium peroxide.

9. A process according to claim 1 wherein the said solution contains sodium perborate.

10. A process according to claim 1 wherein the said solution contains sodium hypochlorite.

11. A process according to claim 1 wherein the said solution contains a mixture of sodium hydroxide and sodium hypochlorite.

12. The process according to claim 1 carried out in continuous manner.

References Cited in the file of this patent

UNITED STATES PATENTS

| 288,669 | Schwarzwaelder | Nov. 20, 1883 |
| 695,475 | McFarlane et al. | Mar. 18, 1902 |
| 1,106,335 | Pinel | Aug. 4, 1914 |
| 2,007,693 | Ruter | July 9, 1935 |
| 2,156,406 | Stagmeier | May 2, 1939 |
| 2,192,212 | Wagner | Mar. 5, 1940 |
| 2,530,272 | Thrasher | Nov. 14, 1950 |

OTHER REFERENCES

"Lye Peeling of Root Crops," by Diamond Alkali Company, Cleveland, Ohio; copyright 1951; page 9, column 2.

Notice of Adverse Decision in Interference

In Interference No. 90,731 involving Patent No. 2,815,783, G. Horvilleur, Sesame seed decorticator, final judgment adverse to the patentee was rendered May 28, 1962, as to claim 5.

[*Official Gazette June 26, 1962.*]